United States Patent [19]

Slegel et al.

[11] Patent Number: 6,088,792
[45] Date of Patent: Jul. 11, 2000

[54] AVOIDING PROCESSOR SERIALIZATION AFTER AN S/390 SPKA INSTRUCTION

[75] Inventors: Timothy John Slegel, Staatsburg; Charles Franklin Webb, Poughkeepsie, both of N.Y.

[73] Assignee: International Business Machines Corporation, Armon, N.Y.

[21] Appl. No.: 09/070,200

[22] Filed: Apr. 30, 1998

[51] Int. Cl.[7] .............................. G06F 9/30; G06F 9/312; G06F 9/318; G06F 9/38
[52] U.S. Cl. ........................ 712/228; 712/206; 712/223; 712/245; 712/209
[58] Field of Search ........................ 714/48, 47; 412/245, 412/215, 217, 228, 206, 223, 209

[56] References Cited

U.S. PATENT DOCUMENTS

| | | | |
|---|---|---|---|
| 4,891,749 | 1/1990 | Hoffman et al. | 711/152 |
| 5,060,148 | 10/1991 | Isobe et al. | 712/6 |
| 5,257,354 | 10/1993 | Comfort et al. | 714/16 |
| 5,307,483 | 4/1994 | Knipfer et al. | 714/10 |
| 5,345,567 | 9/1994 | Hayden et al. | 712/228 |
| 5,440,703 | 8/1995 | Ray et al. | 712/228 |
| 5,748,951 | 5/1998 | Webb et al. | 712/245 |
| 5,941,997 | 8/1999 | Greaves | 714/48 |
| 5,949,971 | 9/1999 | Levine et al. | 714/47 |

OTHER PUBLICATIONS

"The Effects of MP Serialization on Logical Partitioning Capacity" by Bob Ellsworth, Amdahl Corporation, pp. 399–407.

"Maintaining Application Compatibility in Multiprocessor Environments" IBM Technical Disclosure Bulletin, vol. 38, No. 8, Aug. 1995, pp. 333–334.

Special Serialization for "Load–with–Update" Instruction to Reduce the Complexity of Register Renaming Circuitry IBM Technical Disclosure Bulletin, vol. 37, No. 10, Oct. 1994, pp. 59–60.

"PowerPC 601/604 Multiprocessor Random Verification Methodology" IBM Technical Disclosure Bulletin, vol. 37, No. 10, Oct. 1994, pp. 557–561.

"Designing Flexibility into Hardwired Logic" IBM Technical Disclosure Bulletin, vol. 37, No. 3, Mar. 1994, pp. 321–324.

"Multisequencing in a Single Instruction Stream Processing of Parallel Streams" IBM Technical Disclosure Bulletin, vol. 37, No. 1, Jan. 1994, pp. 133–139.

"Offloading Synchronization at 2nd Level" IBM Technical Disclosure Bulletin, vol. 36, No. 7, Jul. 1993, pp. 471–474.

"Multisequencing a Single Instruction Stream—Meta High–End Machine Eliminating SLIST and DLIST" IBM Technical Disclosure Bulletin, vol. 36, No. 6A, Jun. 1993, pp. 91–94.

MSIS Handling S/370 Serialization in MSIS Without Delay, IBM Technical Disclosure Bulletin, vol. 36, No. 1, Jan. 1993, pp. 466–469.

"MSIS MP Version" IBM Technical Disclosure Bulletin, vol. 36, No. 1, Jan. 1993, pp. 317–322.

"System Support for Multiprocessing without an Atomic Storage" IBM Technical Disclosure Bulletin, vol. 33, No. 9, Feb. 1991, pp. 18–23.

*Primary Examiner*—Daniel H. Pan
*Assistant Examiner*—Jungwon Chang
*Attorney, Agent, or Firm*—Lynn L. Augspurger

[57] ABSTRACT

A computer processor that allows the execution of the IBM ESA/390 SPKA instruction, in an overlapped fashion, contains an apparatus that allows the SPKA instruction to be executed without serializing the processor after its execution in most cases, thereby improving performance. It contains a mechanism in the processor's cache that monitors if the Fetch Protect bit in the storage key is on, for instruction data being fetched. It also contains a mechanism to remember if an SPKA instruction has been executed recently. Based on this information, an apparatus determines if it really must serialize the processor after execution of the SPKA instruction.

3 Claims, 2 Drawing Sheets

AVOIDING PROCESSOR SERIALIZATION AFTER AN S/390 SPKA INSTRUCTION

FIELD OF THE INVENTION

This invention is related to a system and method for implementing the IBM ESA/390 architected instruction SPKA when overlap is enabled while avoiding the need to always serialize after the execution of a SPKA to improve performance.

Glossary:

SPKA is the ESA/390 instruction for Set PSW Key From Address which is used to modify the Program Status Word (PSW) access key.

ESA/390 is Enterprise Systems Architecture/390 as defined by the current Principles of Operation, e.g. SA22-7201-00

BACKGROUND OF THE INVENTION

The IBM ESA/390 architecture requires some very precise implementation requirements regarding the SET PSW KEY FROM ADDRESS (SPKA) instruction. This instruction modifies the storage key field in the PSW which controls access to pages in main storage for both instruction fetching and operand references. The architecture requires that such key updates be reflected in the protection exception checking for all logically subsequent storage accesses, including the instruction fetch accesses for the immediately following instructions. In a pipelined processor, however, these instruction fetches will In general have been made, and the protection status resolved, prior to the execution of the SPKA instruction. Thus special controls are required to insure that the correct protection checking is performed for each fetch without compromising the performance benefits of pipelined instruction processing.

In previous IBM S/390 processor designs, this problem was solved by either executing the instruction in microcode/millicode or by unconditionally serializing the processor after execution of the SPKA instruction. By serializing the processor, we mean discarding all instructions that have been pre-fetched or decoded but not executed to completion and restarting instruction fetching again.

The IBM ESA/9000 series as disclosed in U.S. Pat. No. 5,345,567 used a method for handling an SPKA instruction with instruction overlap. This method depends on the existence in the processor design of a method of nullifying an instruction at any time during its execution. In a processor which does not incorporate such a method as part of the overall processor design, a different method is required to allow over-lapped execution of SPKA instructions while satisfying all of the requirements of the ESA/390 architecture.

The ESA/390 architecture requires some very precise implementation requirements. Consistent with the disclosure in U.S. Pat. No. 5,345,567, issued Sep. 6, 1994 and entitled "System and method for modifying program status word, system mask, system access key, and address space code with overlap enabled" by Hayen et al, in an S/390 CPU, the SET PSW KEY FROM ADDRESS (SPKA) instruction causes the storage key stored in PSW bits 8:11 to be changed. If the next instruction, after the SPKA, has the Fetch Protect bit equal to 1 in its page's storage key, the S/390 architecture requires a Protection Exception to be generated and the results of that next instruction to be suppressed.

An even more difficult situation to handle is as follows. Suppose an SPKA is at the end of a line and the I-fetch goes out for the next line before the SPKA executes (also assume the next I-fetch misses the caches so it takes a long time to get back). Now if the I-fetch eventually comes back and has the fetch protect bit turned on, it would have been tested against the old PSW key and the Protection Exception would have been missed.

Fortunately, very seldom is the Fetch Protect bit set to 1 for instruction data. But unfortunately, SPKA is a relatively common instruction. Therefore, to obtain the correct S/390 architected results, a CPU's design must account for an infrequent occurrence yet be able accomplish this with few wasted cycles. The problem has been typically been solved by always serializing the processor after the execution of an SPKA instruction. This degrades performance.

SUMMARY OF THE INVENTION

Our invention provides control logic for processor serialization including a fetch detection logic mechanism to detect that any instruction recently fetched had the Fetch Protect bit on in its storage key, a SPKA execution detection logic mechanism to detect that an SPKA instruction was recently executed, and a PSW execution unit serialization control logic mechanism for serializing the processor only when both events have occurred.

Our invention improves performance by avoiding the unconditional processor serialization after execution of a SPKA instruction.

These and other improvements are set forth in the following detailed description. For a better understanding of the invention with advantages and features, refer to the description and to the drawings.

Figure 1:
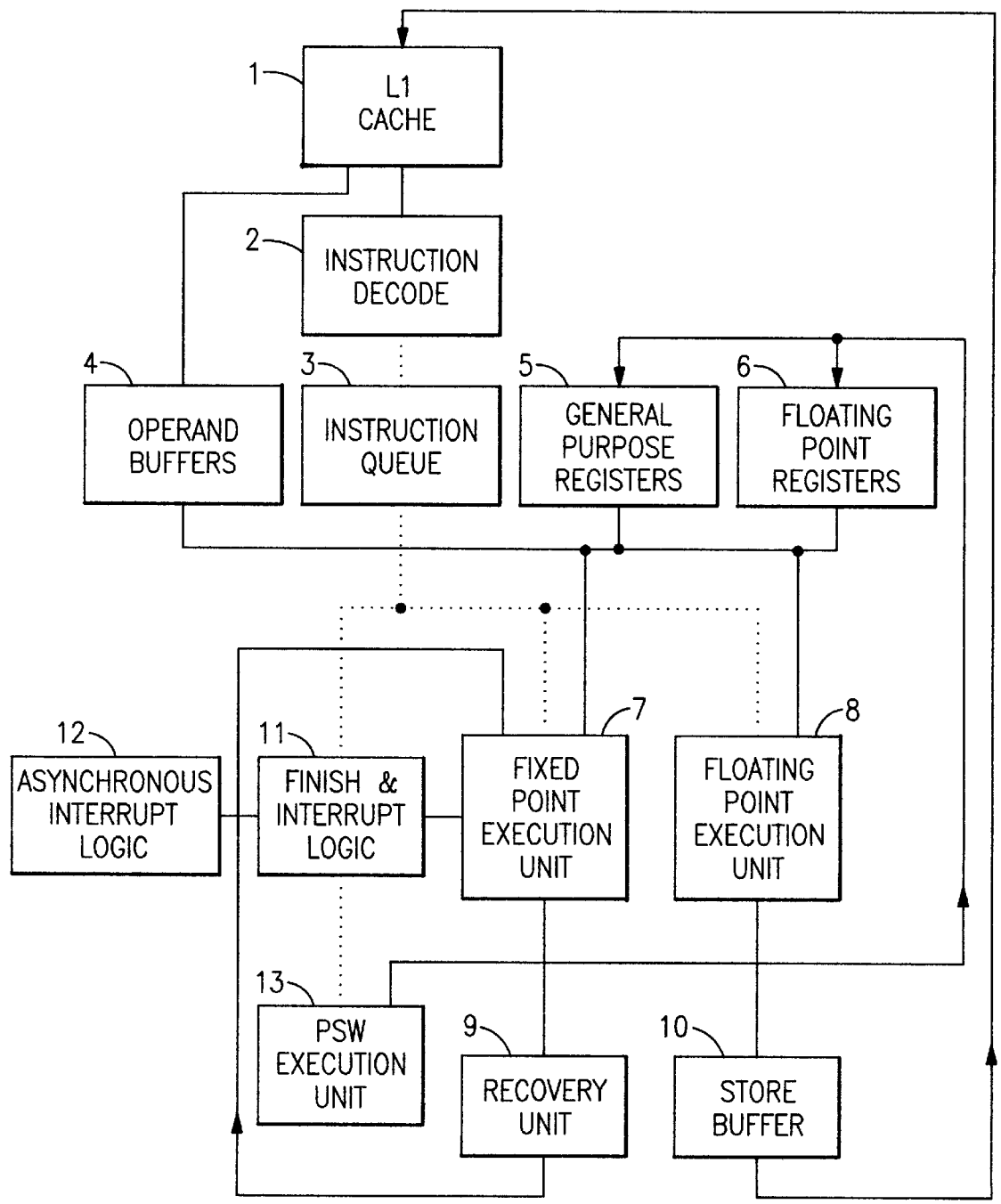
FIG. 1 shows schematically an overview of the preferred embodiment and particularly shows a block diagram illustrating the main components of a typical central processor (CP) in accordance with a preferred specific embodiment of the invention. Of particular interest is the PSW Execution Unit that executes the SPKA instruction and its interface to the Finish and Interrupt Logic which provides the mechanism for serializing the processor only when it is necessary to do so.

(Note: For convenience of illustration, FIGURES may be separated in parts and as a convention we place the top of the FIGURE as the first sheet, with subsequent sheets proceeding down and across when viewing the FIGURE, in the event that multiple sheets are used.)

DETAILED DESCRIPTION OF THE INVENTION

Before considering our preferred embodiments in detail, it may be worthwhile to point out some details which should be understood about the ESA/390 architecture which musty be satisfied.

Considering the situation, where the Fetch Protect bit in the storage key is set to 1 for instruction data, and also the SPKA is at the end of a line and the I-fetch goes out for the next line before the SPKA executes (also assume the next I-fetch misses the caches so it takes a long time to get back). Now if the I-fetch eventually comes back and has the fetch protect bit turned on, it would have been tested against the old PSW key and the Protection Exception would have been missed.

A possible solution to the unusual event would be to discard all instructions that have been pre-fetched, decoded, or partially executed and restart instruction fetching after an SPKA instruction is executed. This is called serialization. This allows the exception detection logic in the processor's L1 cache or I-unit to realize there is a Protection Exception on the next instruction and have it reported correctly. However, serialization is very costly in terms of wasted cycles: a typical processor might take 10 or more cycles to complete the serialization process. The processor in our preferred embodiment executes an SPKA instruction in 1 cycle, so if serialization were always required, as has been done in the past the instruction would 10 times longer than it otherwise needs to.

Obviously, a method that avoids serialization after an SPKA instruction will improve the performance of a processor, and yet how to accomplish this has previously not been taught.

The preferred embodiment of our invention includes:

1. A mechanism to detect if the current instruction being fetched has the Fetch Protect bit on in its storage key, or if it was on for any recent instruction.
2. A mechanism to detect that the current instruction is an SPKA, or that an SPKA has been recently executed.
3. A mechanism to serialize the processor when both of the above conditions have been met.

Therefore, if either condition 1 or condition 2 are not met, serialization will not occur after the execution of the SPKA, and no performance will be lost.

A key word in the above description is the word "recent." Getting it exactly correct is not necessarily obvious. The logic equations below show the critical parts of the implementation:

FETCH_PROT_ACTV$_{13}$ LATCH<=

(L1_IFETCH_FTCH_PROT or FETCH_PROT_ACTV_LATCH) and (not EXC_COND);

SPKA_PREV_EX_LATCH<=

((SPKA_EX and ENDOP) or SPKA_PREV_EX_LATCH) and (not EXC_COND);

SPKA_SERIALIZE<=

SPKA_PREV_EX_LATCH and FETCH_PROT_ACTV_LATCH and EUNIT_START;

where

FETCH_PROT_ACTV_LATCH is a latch that indicates that the current instruction or past instruction had the Fetch Protect bit on in its storage key.

L1_IFETCH_FTCH_PROT indicates the L1 cache detects that Fetch Protect is active for the current instruction.

EXC_COND indicates a processor serialization is currently in progress (for any reason including SPKA_SERIALIZE).

SPKA_PREV_EX_LATCH is a latch that indicates an SPKA is currently being executed or was previously executed.

SPKA_EX indicates an SPKA instruction is currently executing.

ENDOP means an instruction completed successfully.

SPKA_SERIALIZE is the signal that tells the processor serialization logic to serialize the processor.

EUNIT_START indicates the E-unit in the processor is ready to begin execution of a new instruction the next cycle. This corresponds to the E0 cycle in the processor being described in the preferred embodiment.

The FETCH_PROT_ACTV_LATCH is set whenever the L1 cache detects the Fetch Protect bit is on for an I-fetch. It remains on until the next processor serialization event. To improve performance further, the processor being described in the preferred embodiment also resets this latch when the processor begins executing millicode.

The SPKA_PREV_EX_LATCH is set whenever an SPKA instruction successfully completes execution. It remains on until the next processor serialization event. To improve performance further, the processor being described in the preferred embodiment also resets this latch when the processor begins executing millicode.

This mechanism serializes the processor whenever both of the above conditions are met and the processor is about to begin the execution of a new instruction.

Turning now to our invention in greater detail, it will be seen from FIG. 1 which illustrates our preferred embodiment in which a typical processor is shown and the components relevant to this invention. An L1 cache (1) containing the most recently used instruction and operand data supplies instruction text to the instruction decode logic (2). This logic parses the instruction and passes the relevant components to the instruction queue (3) where it is held until it is ready to be executed. When an instruction has been decoded, the operand address(es) is calculated and the operand(s) for that instruction are fetched from the L1 cache and held in the operand buffers (4) until it is ready for execution. The general purpose registers (5) and floating-point registers (6) also supply operands to the execution unit. When all operands for a given instruction are available, the fixed-point execution unit (7) or floating-point execution unit (8) then typically executes some function on the operand(s) for that instruction. When the execution of that instruction is finished, the results of that instruction are written to the general purpose registers (5) or floating-point registers (6). If it was a store-type instruction the results are instead put into a store buffer (10) where they will eventually be written back to the L1 cache (1). In parallel with writing results to the general purpose registers (5) or floating-point registers (6), results are also written to registers in the recovery unit (9) which contains the complete micro-architected state of the processor at any given time. Note that certain control registers may have local shadow copies within the instruction unit, execution unit, or other areas of the processor but the master copy of these control registers is always the recovery unit (9). In parallel with all the above operations, the finish and interrupt logic (11) is continuously monitoring and controlling the completion of the execution of all instructions and the writing of their results. Also, the asynchronous interrupt logic (12) is continually monitoring for pending asynchronous interrupts and presenting them to the finish and interrupt logic (11). The PSW execution unit (13) receives data to load into the PSW from the fixed-point execution unit (7). It contains the latch SPKA_PREV_EX_LATCH and FETCH_PROT_ACTV_LATCH and associated logic as described above. When it detects it is necessary to serialize the processor because of a recently executed SPKA instruction, it notifies the finish and interrupt logic (11) that actually initiates the serialization process.

Figure 2:
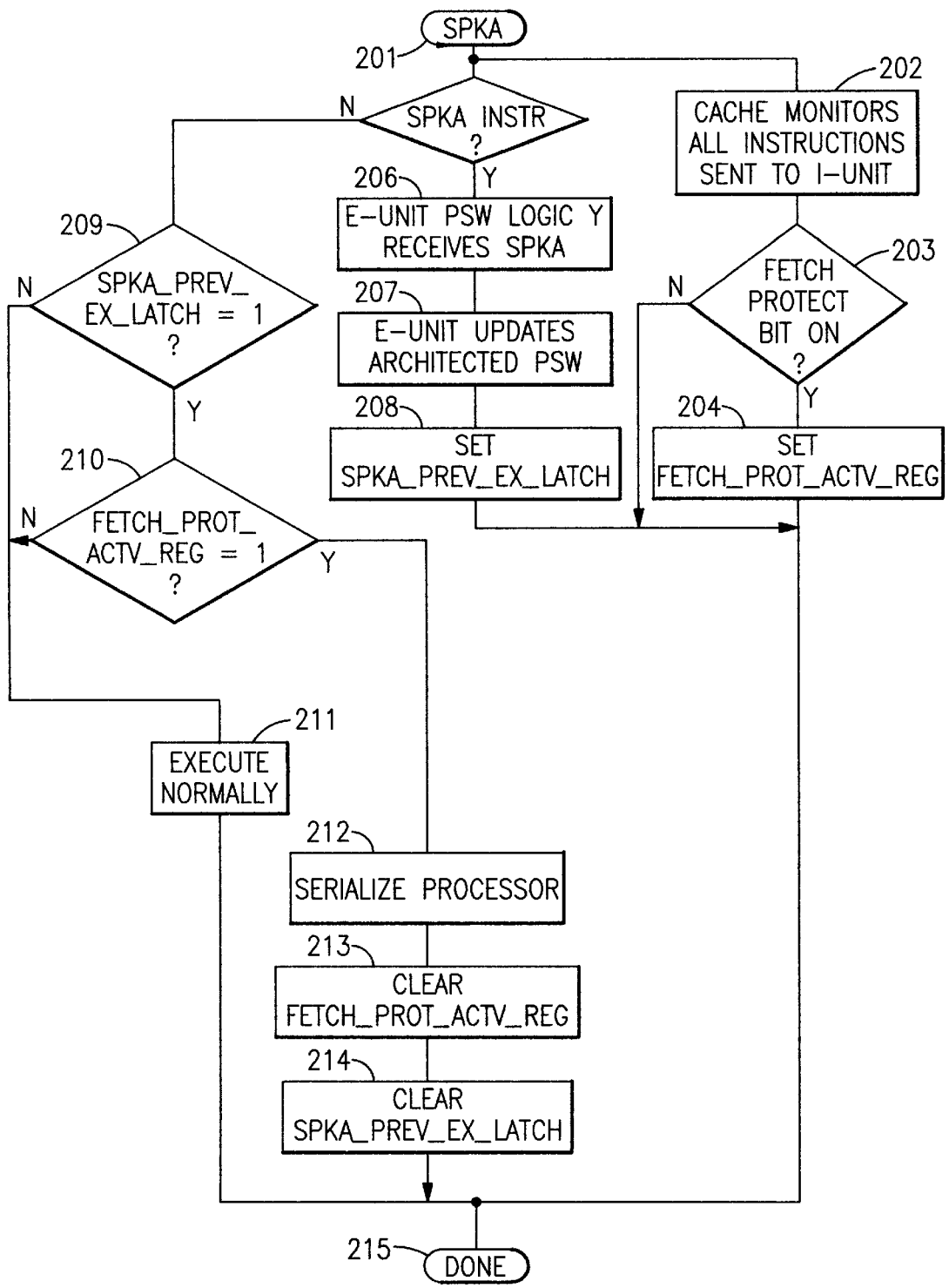
FIG. 2 Illustrates a flow diagram of our method for implementation of the ESA/390 instruction SPKA.

FIG. 2 illustrates a flow diagram of our method for implementation of the ESA/390 instruction SPKA (201). The L1cache continually monitors all instruction data that it sends to the instruction-unit (202) to determine if the Fetch Protect bit is on in the storage key (203) for the piece of data being sent. If it is not on, no further action needs to be taken for the instruction data being fetched (215). If however, it is on, then it notifies the PSW execution unit which sets the FETCH_PROT_ACTV_REG (204).

In parallel with the above actions by the L1cache, the PSW execution unit determines if an SPKA instruction is being executed (205). If it is, then the PSW execution unit receives the SPKA instruction and the data to be loaded (206) and then updates the architected PSW (207). In addition, it sets the SPKA_PREV_EX_LATCH (208). If it not an SPKA instruction being executed, the PSW execution unit continually monitors the states of the SPKA_PREV_EX_LATCH (209) and the FETCH_PROT_ACTV_REG (210). If either one of these latches is zero, processing of instructions continues normally (211). If however, both latches are a logical one, then the PSW execution logic notifies the finish and interrupt logic to serialize the processor (212). In this case, it also clears the FETCH_PROT_ACTV_REG (213) and SPKA_PREV_EX_LATCH (214).

While we have described our preferred embodiments of our invention, it will be understood that those skilled in the art, both now and in the future, may make various improvements and enhancements which fall within the scope of the claims which follow. These claims should be to maintain the proper protection for the invention first disclosed.

What is claimed is:

1. A computer processor comprising:

a processor having an I-unit that fetches and decodes instructions, an E-unit that executes those instructions in an overlapped manner with those of the I-unit, a PSW (Program Status Word) execution unit which allows a ESA/390 SPKA (SET PSW KEY FROM ADDRESS) instruction to be executed without serializing said processor in most cases in order to improve performance of said ESA/390 SPKA instruction, and having a cache that provides recently used instruction data to said I-unit, and having control logic in the PSW execution unit for controlling processor serialization which includes a fetch detection logic and SPKA instruction execution logic whereby the cache continually monitors instruction data passed to the I-unit to determine if the instruction data currently being fetched by said I-unit has a ESA/390 Fetch Protect bit active in a storage key of a PSW (Program Status Word) for the instruction's page, and if the Fetch Protect bit is active the control logic notifies the PSW execution unit that said Fetch Protect bit is active for the instruction data currently being fetched and said fetch detection logic sets a first latch indicating the Fetch Protect bit is active, and when the PSW execution unit determines if an SPKA instruction is to be executed said PSW execution unit updates the PSW with the data for said SPKA instruction and sets a second latch in the PSW execution unit that is set and held when an said SPKA instruction executes, whereby said control logic in the PSW execution unit which continually monitors the state of the first latch that indicates if the Fetch Protect bit was active for a recent instruction fetch and the state of the second latch that indicates if an SPKA instruction has recently executed allows the processor to execute instructions normally, without serializing said processor, if either one of these two latches is not active.

2. A computer processor comprising:

a processor having an I-unit that fetches and decodes instructions, an E-unit that executes those instructions in an overlapped manner with those of the I-unit, a PSW (Program Status Word) execution unit which allows a ESA/390 SPKA (SET PSW KEY FROM ADDRESS) instruction to be executed without serializing said processor in most cases in order to improve performance of said ESA/390 SPKA instruction, and having a cache that provides recently used instruction data to said I-unit, and having control logic in the PSW execution unit for controlling processor serialization which includes a fetch detection logic and SPKA instruction execution logic whereby the cache continually monitors instruction data passed to the I-unit to determine if the instruction data currently being fetched by said I-unit has a ESA/390 Fetch Protect bit active in a storage key of a PSW (Program Status Word) for the instruction's page, and if the Fetch Protect bit is active the control logic notifies the PSW execution unit that said Fetch Protect bit is active for the instruction data currently being fetched and said fetch detection logic sets a first latch indicating the Fetch Protect bit is active, and when the PSW execution unit determines if an SPKA instruction is to be executed said PSW execution unit updates the PSW with the data for said SPKA instruction and sets a second latch in the PSW execution unit that is set and held when an said SPKA instruction executes, whereby said control logic in the PSW execution unit which continually monitors the state of the first latch that indicates if the Fetch Protect bit was active for a recent instruction fetch and the state of the second latch that indicates if an SPKA instruction has recently executed forces the processor to be immediately serialized if both of these two latches are active.

3. A computer processor as in claim 2 wherein the PSW execution unit causes the latch that indicates if the Fetch Protect bit was active for a recent instruction fetch and the latch that indicates if an SPKA instruction has recently executed to be cleared upon detection that the processor has been serialized for any reason, including but not limited to the serialization forced if both of these two latches are active.

* * * * *